Aug. 22, 1939.    W. H. FRANK    2,170,299
CONTINUOUS OUTLET CONSTRUCTION
Filed Aug. 4, 1937

INVENTOR.
William H. Frank
BY
Daniel G. Cullen
ATTORNEY.

Patented Aug. 22, 1939

2,170,299

UNITED STATES PATENT OFFICE 2,170,299

CONTINUOUS OUTLET CONSTRUCTION

William H. Frank, Detroit, Mich.

Application August 4, 1937, Serial No. 157,269

9 Claims. (Cl. 173—334.1)

This application relates to continuous outlet constructions and more particularly to continuous outlet constructions of the type employing a slotted duct having bus bars therein for engagement with prongs of plugs interlocked and inserted into the duct for engagement with the bus bars through the slot of the duct.

A particular object of the invention is to provide a construction of the character described wherein the duct is so formed as to be relatively flexible, whereby it may be manufactured in long lengths, such as several hundred feet, coiled and shipped in coils, just as flexible conduit and wire is at present shipped in coils. In this regard the construction hereof differs from hitherto known continuous outlet constructions which are generally of such material and form that the duct is relatively inflexible and consequently is made and shipped in sections or short lengths, approximately 10 feet or less.

It is a further object to provide a duct which is flexible enough so that when installed it may be bent and curved as desired to conform to the demands raised in installation. The duct hereof may be installed not in accordance with the installation practice now used with hitherto known inflexible continuous outlet duct, but in accordance with methods used in installing flexible conduit or wire.

A further object is to provide a duct which is extremely economical of manufacture and yet satisfactory for the purpose intended, which also can be installed cheaply and expeditiously.

Another object is a metal enclosed duct having the aforesaid features.

For an understanding of the continuous outlet construction herein disclosed, reference should be had to the appended drawing. In this drawing.

Figure 1:
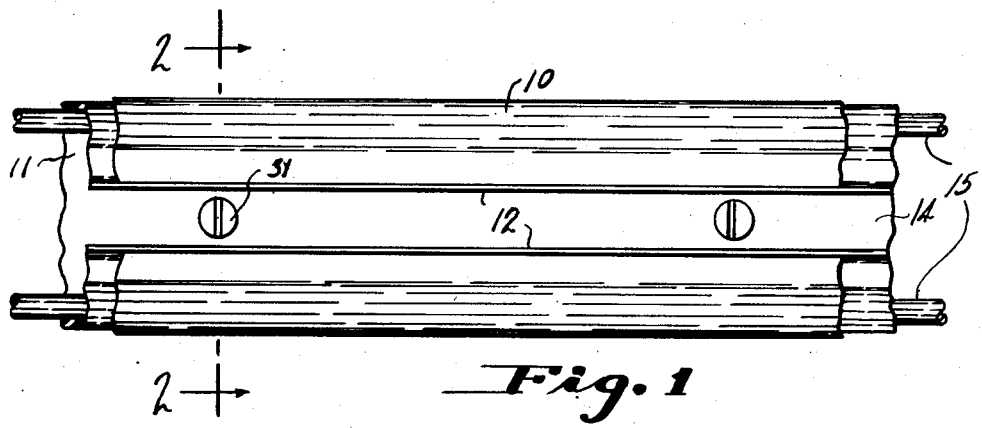
Fig. 1 is a plan view of a fragment of the duct.

The duct shown includes a casing 10, an insulation liner 11, and two bus bars. The casing is formed from a thin metal ribbon or the like 10 folded as indicated. It is lined with a liner of insulation 11 formed of thin ribbon. The liner edges are preferably flanged as at 12 to form protectors for the edges of the casing at the plug receiving slot 14. Within the bights of the lined casing are bus bars 15 of soft round copper wire or the like around which are formed the casing and its insulation liner.

Figure 2:
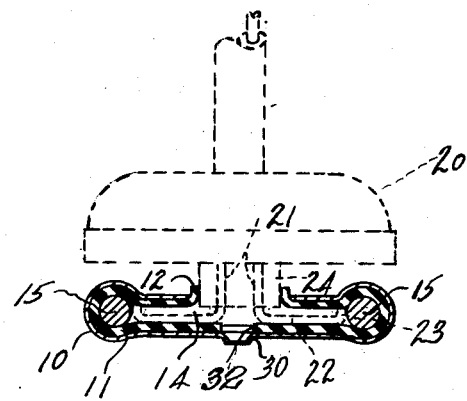
Fig. 2 is a section on line 2—2 of Fig. 1, but showing diagrammatically the association of a plug with the duct.

Diagrammatically shown in Fig. 2 in association with the duct is a plug 20 having prongs 21 whose ends are formed to provide feet 22 having lugs 23 struck therefrom for engaging the bus bars when the plug is associated with the duct. The prongs are within thimbles 24 projecting from the plug proper.

For securing the duct to a surface, the casing may have countersunk flanged holes 30 formed therein, as shown in Fig. 2, for the reception of securing screws 31; aligning with the holes of the duct, there are provided holes 32 in the insulation liner 11, as indicated.

Because of the indicated cross section of the duct, the duct may be coiled with the slot on the outside of each turn, to facilitate shipment and transport of the duct.

It will be observed that the duct is formed around the bus bars, that is to say, the closing in of the side of the duct to form the slotted wall is done after the bus bars are in place and is done in such a manner that the duct interior tightly engages and clamps in place the bus bars. The duct herein shown is not one wherein the duct is formed and the bus bars inserted therein afterwards; the reverse is true, and care is taken during the formation of the duct around the bus bars to insure the duct being tightly clamped around the bus bars so that the bus bars are relatively immovable.

It will also be observed that because of the minified space between the slotted wall of the duct and the unslotted wall of the duct, and also because of the remoteness of the bus bars from the entrances into such space, the bus bars are immovably secured in the duct and are also virtually inaccessible against accidental contact. This is of great importance, as will readily be recognized.

It will also be observed that the bus bar might well be made of stranded wire rather than the round solid wire indicated, in order to enhance the flexibility of the duct, it being well known that stranded wire is more flexible than solid wire.

Now having described the continuous outlet construction herein shown, reference will be had to the claims which follow for a determination of the scope hereof.

I claim:

1. A slotted duct formed of thin sheet material and containing bus bars and having a solid wall and a slotted wall connected at their edges by portions formed around the bus bars, with the interior distance between the solid wall and the slotted wall being less than the thickness of the bus bars measured in the same direction.

2. A slotted duct formed of thin sheet material and containing bus bars of round cross section and having a solid wall and a slotted wall connected at their edges by portions formed around the bus bars, with the interior distance between the solid wall and the slotted wall being less than the diameter of the bus bars.

3. A slotted duct of thin sheet material and containing bus bars and having a solid wall and a slotted wall connected at their edges by enlarged bead-like portions formed around the bus bars, with the interior distance between the solid wall and the slotted wall being less than the thickness of the bus bars measured in the same direction.

4. A slotted duct of thin sheet material and containing bus bars of round cross section and having a solid wall and a slotted wall connected at their edges by enlarged bead-like portions formed around the bus bars, with the interior distance between the solid wall and the slotted wall being less than the diameter of the bus bars.

5. A slotted duct of thin sheet material and containing bus bars and having a flat solid wall and a flat slotted wall connected at their edges by portions formed around the bus bars, with the interior clear distance between the solid wall and the slotted wall being no greater than the thickness of the bus bars measured in the same direction.

6. A slotted duct of thin sheet material and containing bus bars and having a flat solid wall and a flat slotted wall connected at their edges by portions formed around the bus bars, with the interior clear distance between the solid wall and the slotted wall being no greater than the thickness of the bus bars measured in the same direction, the bus bars being of round cross section.

7. A slotted duct comprising a casing formed from a ribbon of thin sheet material having its edges flanged inwardly to provide a flat wall and flanges parallel thereto and defining a slot between them, the width of the duct being considerably greater than the distance between the flanges and the flat wall, and two separate and independent bus bars between the flanges and the flat wall and disposed in the folds or merging zones of the flanges and the flat wall, the clear distance between the flanges and the flat wall being less than that between the slot and the folds.

8. A slotted duct comprising a casing formed from a ribbon of thin sheet material having its edges flanged inwardly to provide a flat wall and flanges parallel thereto and defining a slot between them, the width of the duct being considerably greater than the distance between the flanges and the flat wall, and two separate and independent bus bars between the flanges and the flat wall and disposed in the folds or merging zones of the flanges and the flat wall, the clear distance between the flanges and the flat wall being less than that between the slot and the folds, the interior of the duct being lined with insulation for insulating the bus bars from the casing.

9. A slotted duct comprising a casing formed from a ribbon of thin sheet material having its edges flanged inwardly to provide a flat wall and flanges parallel thereto and defining a slot between them, the width of the duct being considerably greater than the distance between the flanges and the flat wall, and two separate and independent bus bars between the flanges and the flat wall and disposed in the folds or merging zones of the flanges and the flat wall, the clear distance between the flanges and the flat wall being less than that between the slot and the folds, the clear distance between the flanges and the flat wall being less than the thickness of the bus bars measured in the same direction.

WILLIAM H. FRANK.